US012618717B2

(12) United States Patent (10) Patent No.: US 12,618,717 B2
Cai (45) Date of Patent: May 5, 2026

(54) INFRARED TEMPERATURE MEASUREMENT METHOD, APPARATUS, AND DEVICE, AND STORAGE MEDIUM

(71) Applicant: Hangzhou Hikvision Digital Technology Co., Ltd., Hangzhou (CN)

(72) Inventor: Xiaowang Cai, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 748 days.

(21) Appl. No.: 17/905,687

(22) PCT Filed: Mar. 4, 2021

(86) PCT No.: PCT/CN2021/079011
§ 371 (c)(1),
(2) Date: Sep. 6, 2022

(87) PCT Pub. No.: WO2021/175281
PCT Pub. Date: Sep. 10, 2021

(65) Prior Publication Data

US 2023/0105139 A1 Apr. 6, 2023

(30) Foreign Application Priority Data

Mar. 6, 2020 (CN) .......................... 202010153100.3

(51) Int. Cl.
*G01J 5/70* (2022.01)
*G01J 5/00* (2022.01)
(Continued)

(52) U.S. Cl.
CPC . *G01J 5/70* (2022.01); *G01J 5/00* (2013.01);
*G01J 5/0275* (2013.01); *G01J 5/07* (2022.01);
*G06T 7/194* (2017.01)

(58) Field of Classification Search
CPC combination set(s) only.
See application file for complete search history.

(56) References Cited

U.S. PATENT DOCUMENTS

2015/0025832 A1 1/2015 Chen et al.
2016/0335495 A1 11/2016 Kim et al.

FOREIGN PATENT DOCUMENTS

CN 104076925 10/2014
CN 105874473 8/2016
(Continued)

OTHER PUBLICATIONS

Fulton, Wayne. "www.Scantips.com." Calculator to Compute the Distance or Size of an Object in a Photo Image, Wayne Fulton, 2015, www.scantips.com/lights/subjectdistance.html. (Year: 2015).*
(Continued)

*Primary Examiner* — Vu Le
*Assistant Examiner* — Matthew James Bodnark
(74) *Attorney, Agent, or Firm* — NORTON ROSE FULBRIGHT US LLP

(57) ABSTRACT

An infrared temperature measurement method, apparatus, device, and storage medium, which relate to the field of image processing is disclosed. The method comprises: determining a measurement temperature of a to-be-measured target based on a grayscale image captured to obtain a first measurement temperature; determining key point coordinates of the target based on a target image; determining a first distance based on the key point coordinates and configuration information of an infrared temperature measurement device, the first distance is a distance between the target and the infrared temperature measurement device;
(Continued)

determining an actual temperature of the target based on the first measurement temperature and the first distance. In this way, the target image ranging and grayscale image temperature measurement can be combined, which not only reduces the influence of distance on the measurement temperature, but also avoids the problem of inaccurate measurement temperature when the distance does not meet the requirements.

15 Claims, 3 Drawing Sheets

(51) Int. Cl.

| | | |
|---|---|---|
| *G01J 5/02* | (2022.01) | |
| *G01J 5/07* | (2022.01) | |
| *G06T 7/194* | (2017.01) | |

(56) References Cited

FOREIGN PATENT DOCUMENTS

| | | | | |
|---|---|---|---|---|
| CN | 106124062 | 11/2016 | | |
| CN | 110160670 | 8/2019 | | |
| DE | 102016218291 | 3/2018 | | |
| JP | 2017003279 A | * 1/2017 | ............. | G01B 11/00 |
| KR | 101754154 B1 | * 7/2017 | ............... | H04N 7/18 |

OTHER PUBLICATIONS

Extended European Search Report issued in corresponding European Application No. 21764753.6, dated Jun. 28, 2023.
International Search Report and Written Opinion issued in Corresponding PCT Application No. PCT/CN2021/07901, dated May 24, 2021 (English Translation provided).
Office Action issued in corresponding Chinese Application No. 202010153100.3, dated Apr. 6, 2023.

* cited by examiner

INFRARED TEMPERATURE MEASUREMENT METHOD, APPARATUS, AND DEVICE, AND STORAGE MEDIUM

CROSS REFERENCE TO RELATED APPLICATIONS

The present application is a national phase application under 35 U.S.C. § 371 of International Application No. PCT/CN2021/079011, filed Mar. 4, 2021, which claims the benefit of priority to Chinese Patent Application No. 202010153100.3 filed with the China National Intellectual Property Administration on Mar. 6, 2020 and entitled "INFRARED TEMPERATURE MEASUREMENT METHOD, APPARATUS, AND DEVICE, AND STORAGE MEDIUM", each of which are incorporated herein by reference in their entirety.

TECHNICAL FIELD

Embodiments of the present application relate to the field of image processing, and in particular, to an infrared temperature measurement method, apparatus, device, and storage medium.

BACKGROUND

When measuring temperature, one generally needs to use a thermometer. Traditional mercury thermometers need a certain time to measure temperature and are inefficient in measuring temperature. Therefore, infrared temperature measurement devices based on infrared light have emerged in the market, which measure temperature relatively quickly and can be used at various passages and ports. However, as the distance between a target and an infrared temperature measurement device will affect the temperature measured by the infrared temperature measurement device, when the distance between the target and the infrared temperature measurement device changes, the temperature measured by the infrared temperature measurement device will change too. Moreover, the temperature measured at a different distance may be different. Therefore, the temperature of the target cannot be accurately determined.

In the relevant art, in an infrared temperature measurement device, a capacitive distance sensor used for determining the distance between a target and the infrared temperature measurement device can be integrated, so as to enable obtaining a more accurate temperature when the target is at an appropriate distance. However, this method needs to constantly adjust the distance between the infrared temperature measurement device and the target. If the distance does not meet requirements, the temperature obtained may be inaccurate, thus affecting temperature measuring precision and temperature measuring efficiency.

SUMMARY

Embodiments of the present application provide an infrared temperature measurement method, apparatus, device, and storage medium, which can solve the problem in the relevant art that temperature cannot be measured when the distance does not meet requirements and thus temperature measuring precision and temperature measuring efficiency are affected. The technical solutions are as follows:

In one aspect, an infrared temperature measurement method is provided, the method includes:

determining a measurement temperature of a to-be-measured target based on a grayscale image captured to obtain a first measurement temperature;

determining key point coordinates of the target based on a target image;

determining a first distance based on the key point coordinates and configuration information of an infrared temperature measurement device, wherein the first distance is a distance between the target and the infrared temperature measurement device;

determining an actual temperature of the target based on the first measurement temperature and the first distance.

In a possible mode of realization of embodiments of the present application, the target image includes the grayscale image; or, the target image includes a visible light image; or, the target image includes a fusion image determined based on the grayscale image and the visible light image.

In a possible mode of realization of embodiments of the present application, the key point coordinates of the target include coordinates of a first key point and coordinates of a second key point, wherein the first key point and the second key point are any two key points whose actual distance is known among key points of the target, the configuration information includes a focal distance and a pixel size;

determining the first distance based on the key point coordinates and configuration information of the infrared temperature measurement device, includes:

determining a horizontal distance between the first key point and the second key point in the target image, and determining a vertical distance between the first key point and the second key point in the target image, based on the coordinates of the first key point and the coordinate of the second key point to obtain a first horizontal distance and a first vertical distance;

determining a second distance based on the first horizontal distance, the first vertical distance, and the pixel size, wherein the second distance is a distance between the first key point and the second key point in the target image;

determining the first distance based on a first actual distance, the focal distance, and the second distance, wherein the first actual distance is an actual distance between the first key point and the second key point.

In a possible mode of realization of embodiments of the present application, the target image includes a visible light image, the key point coordinates are facial key point coordinates, before determining the second distance based on the first horizontal distance, the first vertical distance and the pixel size, the method further includes:

if it is determined that a facial area of the target is not a frontal image based on the visible light image, determining a yaw angle and a pitch angle of the target;

correcting the first horizontal distance based on the yaw angle and correcting the first vertical distance based on the pitch angle to obtain a second horizontal distance and a second vertical distance;

obtaining the second distance based on the first horizontal distance, the first vertical distance, and the pixel size includes:

determining the second distance based on the second horizontal distance, the second vertical distance, and the pixel size.

In a possible mode of realization of embodiments of the present application, the target image includes a visible light image, the key point coordinates are facial key point coordinates, before determining the first distance based on the key point coordinates and the configuration information of the infrared temperature measurement device, the method further includes:

if it is determined that a facial area of the target is not a frontal image based on the visible light image, correcting the facial area based on the key point coordinate;

determining key point coordinates of the corrected facial area;

determining the first distance based on the key point coordinates and the configuration information of the infrared temperature measurement device, includes:

determining the first distance based on the key point coordinates of the corrected facial area and the configuration information.

In a possible mode of realization of embodiments of the present application, determining the first distance based on a first actual distance, the focal distance, and the second distance includes:

multiplying the first actual distance by the focal distance to obtain a first value;

dividing the first value by the second distance to obtain a second value;

determining the second value as the first distance.

In a possible mode of realization of embodiments of the present application, the determining the actual temperature of the target based on the first measurement temperature and the first distance includes:

determining a corresponding temperature from a first mapping relationship based on the first measurement temperature and the first distance, the first mapping relationship is used for indicating a corresponding relationship among a measurement temperature, the distance between the target and the infrared temperature measurement device, and a temperature;

determining the determined temperature as the actual temperature of the target.

In a possible mode of realization of embodiments of the present application, determining a measurement temperature of a to-be-measured target based on a grayscale image captured to obtain the first measurement temperature, includes:

determining a facial area of the target in the grayscale image;

obtaining an environment temperature;

determining the first measurement temperature based on the environment temperature, grayscale values of pixel points in the facial area, and a specified functional relationship, the specified functional relationship is used for indicating a functional relationship among an environment temperature, a grayscale value, and a measurement temperature.

In a possible mode of realization of embodiments of the present application, the target image includes a visible light image, determining the facial area of the target in the grayscale image includes:

determining first facial area coordinates of the target in the visible light image, the first facial area coordinates are used for indicating a facial area of the target in the visible light image;

determining corresponding second facial area coordinates from a second mapping relationship based on the first facial area coordinates, the second mapping relationship is used for indicating a corresponding relationship between coordinates of a pixel point in the grayscale image and coordinates of a pixel point in the visible light image;

determining the facial area of the target in the grayscale image based on the second facial area coordinates.

In a possible mode of realization of embodiments of the present application, there is a plurality of pixel points in the facial area, determining the first measurement temperature based on the environment temperature, the grayscale values of the pixel points in the facial area, and the specified functional relationship, includes:

determining a measurement temperature corresponding to each pixel point based on the environment temperature, a grayscale value of each pixel point of the plurality of pixel points, and the specified functional relationship to obtain a second measurement temperature of each pixel point;

determining the first measurement temperature based on the second measurement temperature of each pixel point of the plurality of pixel points.

In another aspect, an infrared temperature measurement apparatus is provided, the infrared temperature measurement apparatus includes a temperature measuring module, an image detecting module, a distance measuring module, and a temperature compensating module;

the temperature measuring module is configured for determining a measurement temperature of a to-be-measured target based on a grayscale image captured to obtain a first measurement temperature;

the image detecting module is configured for determining key point coordinates of the target based on a target image;

the distance measuring module is configured for determining a first distance based on key point coordinates and configuration information of an infrared temperature measurement device, wherein the first distance is a distance between the target and the infrared temperature measurement device;

the temperature compensating module is configured for determining an actual temperature of the target based on the first measurement temperature and the first distance.

In a possible mode of realization of embodiments of the present application, the target image includes the grayscale image; or, the target image includes a visible light image; or, the target image includes a fusion image determined based on the grayscale image and the visible light image.

In a possible mode of realization of embodiments of the present application, the distance measuring module is configured for:

the key point coordinates of the target include coordinates of a first key point and coordinates of a second key point, wherein the first key point and the second key point are any two key points whose actual distance is known among key points of the target, the configuration information includes a focal distance and a pixel size;

determining a horizontal distance between the first key point and the second key point in the target image, and determining a vertical distance between the first key point and the second key point in the target image, based on the coordinates of the first key point and the coordinates of the second key point to obtain a first horizontal distance and a first vertical distance;

determining a second distance based on the first horizontal distance, the first vertical distance, and the pixel size, the second distance is a distance between the first key point and the second key point in the target image;

determining the first distance based on a first actual distance, the focal distance, and the second distance, the first actual distance is an actual distance between the first key point and the second key point.

In a possible mode of realization of embodiments of the present application, the distance measuring module is further configured for:

the target image includes a visible light image, the key point coordinates are facial key point coordinates, if it is determined that a facial area of the target is not a frontal image based on the visible light image, determining a yaw angle and a pitch angle of the target;

correcting the first horizontal distance based on the yaw angle and correcting the first vertical distance based on the pitch angle to obtain a second horizontal distance and a second vertical distance;

determining the second distance based on the second horizontal distance, the second vertical distance, and the pixel size.

In a possible mode of realization of embodiments of the present application, the distance measuring module is further configured for:

the target image includes a visible light image, the key point coordinates are facial key point coordinates, if it is determined that a facial area of the target is not a frontal image based on the visible light image, correcting the facial area based on the key point coordinates;

determining key point coordinates of the corrected facial area;

determining the first distance based on the key point coordinates of the corrected facial area and the configuration information.

In a possible mode of realization of embodiments of the present application, the distance measuring module is configured for:

multiplying the first actual distance by the focal distance to obtain a first value;

dividing the first value by the second distance to obtain a second value;

determining the second value as the first distance.

In a possible mode of realization of embodiments of the present application, the temperature compensating module is configured for:

determining a corresponding temperature from a first mapping relationship based on the first measurement temperature and the first distance, the first mapping relationship is used for indicating a corresponding relationship among a measurement temperature, the distance between the target and the infrared temperature measurement device, and a temperature;

determining the temperature determined as the actual temperature of the target.

In a possible mode of realization of embodiments of the present application, the temperature measuring module is configured for:

determining a facial area of the target in the grayscale image;

obtaining an environment temperature;

determining the first measurement temperature based on the environment temperature, grayscale values of pixel points in the facial area, and a specified functional relationship, the specified functional relationship is used for indicating a functional relationship among an environment temperature, a grayscale value, and a measurement temperature.

In a possible mode of realization of embodiments of the present application, the temperature measuring module is configured for:

the target image includes a visible light image, determining first facial area coordinates of the target in the visible light image, the first facial area coordinates are used for indicating a facial area of the target in the visible light image;

determining corresponding second facial area coordinates from a second mapping relationship based on the first facial area coordinates, the second mapping relationship is used for indicating a corresponding relationship between coordinates of a pixel point in the grayscale image and coordinates of a pixel point in the visible light image;

determining the facial area of the target in the grayscale image based on the second facial area coordinates.

In a possible mode of realization of embodiments of the present application, the temperature measuring module is configured for:

there is a plurality of pixel points in the facial area, determining a measurement temperature corresponding to each pixel point based on the environment temperature, a grayscale value of each pixel point of the plurality of pixel points, and the specified functional relationship to obtain a second measurement temperature of each pixel point;

determining the first measurement temperature based on the second measurement temperature of each pixel point of the plurality of pixel points.

In another aspect, an infrared temperature measurement device is provided, the infrared temperature measurement device includes an image sensor and a processor;

the image sensor is configured for capturing a grayscale image;

the processor is configured for processing the grayscale image, determining a first measurement temperature of a to-be-measured target, and realizing the steps of the above-described infrared temperature measurement method based on a target image, configuration information of the infrared temperature measurement device, and the first measurement temperature.

In a possible mode of realization of embodiments of the present application, the infrared temperature measurement device further includes a temperature sensor, the temperature sensor is configured for obtaining an environment temperature, the environment temperature is used by the processor to determine the first measurement temperature.

In a possible mode of realization of embodiments of the present application, when the target image includes a visible light image, the image sensor includes a binocular camera device, the binocular camera device is configured for capturing the grayscale image and the visible light image.

In another aspect, a computer readable storage medium is provided, the storage medium having a computer program stored therein, the computer program, when executed by a processor, realizing the steps of the above-described infrared temperature measurement method.

In another aspect, a computer program product containing instructions is provided, the computer program product, when running on a computer, causing the computer to execute the steps of the above-described infrared temperature measurement method.

The technical solutions provided by the embodiments of the present application can at least bring the following beneficial effects:

A first measurement temperature is obtained by determining a measurement temperature of a to-be-measured target based on a grayscale image captured. As the distance between the to-be-measured target and an infrared temperature measurement device will affect this first measurement temperature, one can first determine key point coordinates of the target based on a target image, then determine a first distance between the target and the infrared temperature measurement device based on the key point coordinates and configuration information of the infrared temperature measurement device, and then determine an actual temperature of the target based on the first measurement temperature and the first distance. In this way, the first distance can be determined based on the target image without controlling the distance between the target and the infrared temperature measurement device, and the actual temperature of the target can be obtained by compensating the first measurement temperature based on the first distance. The target image ranging and grayscale image temperature measurement can be combined, which not only reduces the influence of distance on the measurement temperature, but also avoids the problem of inaccurate measurement temperature when the distance does not meet the requirements, thus improving temperature measuring precision and temperature measuring efficiency.

BRIEF DESCRIPTION OF DRAWINGS

In order to illustrate the technical solutions in embodiments of the present application more clearly, the following briefly introduces the accompanying drawings that are used in the description of embodiments. Obviously, the accompanying drawings described below are only some embodiments of the present application. For those of ordinary skill in the art, other drawings can also be obtained from these accompanying drawings without creative effort.

DETAILED DESCRIPTION OF EMBODIMENTS

In order to make the objectives, technical solutions, and advantages of embodiments of the present application clearer, embodiments of the present application will be further described in detail below with reference to the accompanying drawings.

Before explaining and describing in detail the infrared temperature measurement method provided by the embodiments of the present application, the entity executing the infrared temperature measurement method provided by the embodiments of the present application is introduced first.

Figure 1:
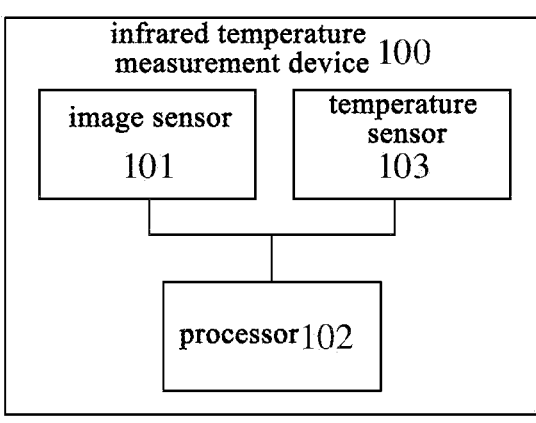
FIG. 1 is a schematic structural view of an infrared temperature measurement device illustrated according to an exemplary embodiment.

In reference to FIG. 1, FIG. 1 is a schematic structural view of an infrared temperature measurement device illustrated according to an exemplary embodiment. The entity executing the infrared temperature measurement method provided by the embodiments of the present application is an infrared temperature measurement device 100. The infrared temperature measurement device 100 can include an image sensor 101 and a processor 102.

The image sensor 101 is configured for capturing a grayscale image.

In an implementation, after capturing the grayscale image, the image sensor 101 can send the grayscale image to the processor.

The processor 102 is used for processing the grayscale image to determine a first measurement temperature of a to-be-measured target, and determine an actual temperature of the target based on the target image, configuration information of the infrared temperature measurement device 100, and the first measurement temperature.

As an example, the infrared temperature measurement device 100 can further include a temperature sensor 103, the temperature sensor 103 is configured for obtaining an environment temperature, and the environment temperature is used by the processor 102 to determine the first measurement temperature.

In the implementation, after obtaining an environment temperature, the temperature sensor will send the environment temperature to the processor 102.

In a possible mode of realization, when the target image includes a visible light image, the infrared temperature measurement device 100 can further include a binocular camera device, the binocular camera device is configured for capturing the grayscale image and the visible light image by means of the image sensor 101.

In an implementation, the binocular camera device can include two cameras, one for capturing a visible light image, the other for capturing a grayscale image. Optionally, the binocular camera device can be referred to as a binocular camera that combines a visible light camera and a thermal infrared camera.

Further, in the event that the target image comprises a fusion image, the processor 102 can be used for performing image fusion of the grayscale image and the visible light image to obtain a fusion image, determining the fusion image as the target image, and then determining an actual temperature of the target based on the target image, configuration information of the infrared temperature measurement device, and the first measurement information.

In other words, after the binocular camera device captures a visible light image and a grayscale image by means of the image sensor 101, the visible light image and the grayscale image can be sent to the processor 102 for image fusion processing.

In another possible mode of realization, the infrared temperature measurement device 100 can include a monocular camera device used for capturing a grayscale image by means of the image sensor 101 and sending the grayscale image to the processor 102, so that the processor 102 can process the grayscale image, and implement the infrared temperature measurement method provided by the embodiments of the present application. Optionally, the monocular camera device can be referred to as a thermal infrared camera.

A person skilled in the art should be able to understand that the above-described infrared temperature measurement device is merely cited as an example. Other infrared temperature measurement devices that existing currently or may emerge in the future can be suitable for embodiments of the present application, should also be contained within the scope of protection of the present application, and are hereby incorporated herein by reference.

Having introduced the entity executing the infrared temperature measurement method provided by the embodiments of the present application, the infrared temperature measurement method provided by the embodiments of the present application will be explained and described in detail next.

Figure 2:
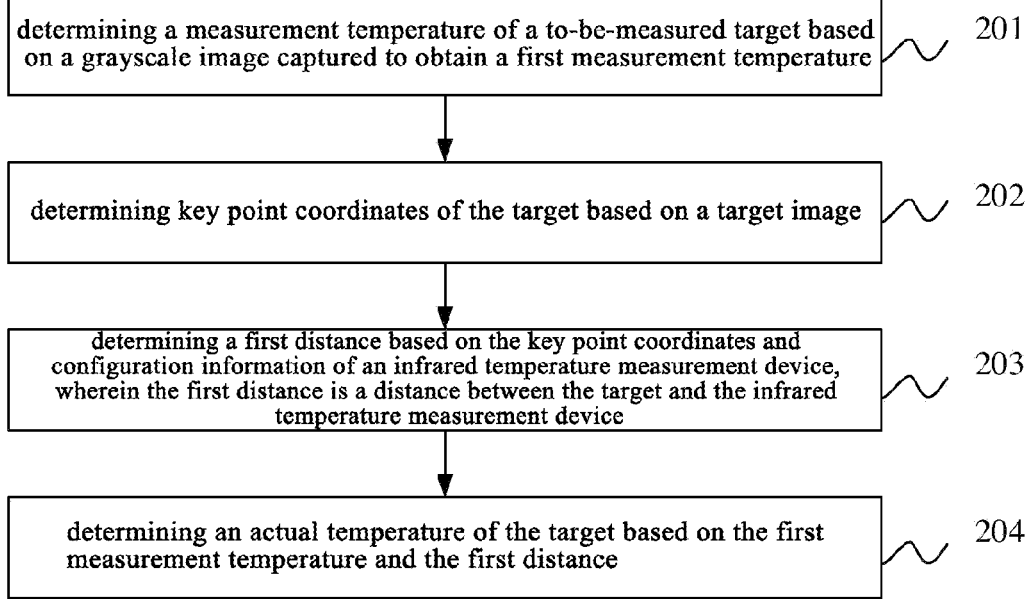
FIG. 2 is a flow chart of an infrared temperature measurement method illustrated according to an exemplary embodiment.

FIG. 2 is a flow chart of an infrared temperature measurement method illustrated according to an exemplary embodiment. The method is applied in the infrared temperature measurement device shown in FIG. 1. In reference to FIG. 2, the method can include the following steps:

Step 201: determining a measurement temperature of a to-be-measured target based on a grayscale image captured to obtain a first measurement temperature.

The grayscale image is an image obtained by the image sensor based on infrared light and does not contain color information. By way of example, the infrared temperature measurement device includes a grayscale image capturing unit, which is used to capture a grayscale image (also called a thermal infrared grayscale image). For example, the infrared temperature measurement device includes a thermal infrared camera comprising a grayscale image capturing unit by means of which a grayscale image is captured.

In a possible mode of realization, this step may specifically include: determining a facial area of the target in the grayscale image; obtaining an environment temperature, and determining a first measurement temperature based on the environment temperature, grayscale values of pixel points in the facial area, and a specified functional relationship, wherein the specified functional relationship is used for indicating a functional relationship between an environment temperature, a grayscale value, and a measurement temperature.

By way of example, the infrared temperature measurement device can further include a temperature sensor by means of which an environment temperature can be obtained.

As the functional relationship among an environment temperature, a grayscale value, and a measurement temperature can be determined in advance and stored in the infrared temperature measurement device, and based on the specified functional relationship between the three, when two parameters are known, the other parameter can be determined, Therefore, in order to determine a measurement temperature, an environment temperature and a grayscale value can be determined first, and then, based on the environment temperature, the grayscale value, and the specified functional relationship, the measurement temperature is determined. In embodiments of the present application, the environment temperature can be obtained directly, then a facial area of the target in the grayscale image can be determined, grayscale values of pixel points in the facial area are obtained, and based on the specified functional relationship, the first measurement temperature is determined when the environment temperature and the grayscale values of the pixel points in the facial area are known.

In an implementation, determining a facial area of the target in the grayscale image may include the following two implementations:

First way: if the infrared temperature measurement device further includes a visible light capturing unit, then a visible light image can be captured by means of the visible light image capturing unit. Thus, first facial area coordinates of the target in the visible light image used for indicating a facial area of the target in the visible light image can be determined. Based on the first facial area coordinates, corresponding second facial area coordinates are determined from a second mapping relationship used for indicating a corresponding relationship between coordinates of a pixel point in a grayscale image and coordinates of a pixel point in a visible light image. Based on the second facial area coordinates, a facial area of the target in the grayscale image is determined.

The visible light image and the grayscale image can be captured at the same time by the infrared temperature measurement device. As an example, the visible light image capturing unit included in the infrared temperature measuring receives a visible light signal, such as a visible light signal reflected by an object, converts the visible light signal into a corresponding electrical signal, and then performs image signal processing on the electrical signal to obtain a digitized visible light image. The grayscale image capturing unit included in the infrared temperature measurement device receives an infrared signal emitted by the object, converts the infrared signal into a corresponding electrical signal, and then performs image signal processing on the electrical signal to obtain a digitized grayscale image. For example, the infrared temperature measurement device includes a binocular camera that combines a visible light camera and a thermal infrared camera. The visible light camera and the thermal infrared camera simultaneously capture images of the target, and obtain the visible light image and the grayscale image respectively.

In other words, the corresponding first facial area coordinates of a facial area of the target in the visible light image can be determined first, then, based on the first facial area coordinates and a corresponding relationship between coordinates of a pixel point in a grayscale image and coordinates of a pixel point in a visible light image (in other words, the above-described second mapping relationship), the second facial area coordinates of the target in the grayscale image are determined and thus the facial area of the target in the grayscale image is determined.

In an implementation, the first facial area coordinates of the target in the visible light image can be determined by using a CNN (Convolutional Neural Network) face detection module. By way of example, the CNN model needs to be trained first to obtain a face detection module, and then a visible light image of a facial area to-be-measured is input into the face detection module, which outputs the first facial area coordinates.

As an example, one way of training the CNN module to obtain a face detection module is: capturing a plurality of image samples, for example, capturing visible light images of one or more target samples to obtain a plurality of image samples, calibrating facial area coordinates of a target sample in each image sample, taking one image sample and the calibrated facial area coordinates of the target sample in the image sample as a training data set, and thus determining a plurality of training data sets. Then, the plurality of training data sets are input into the CNN model to perform model training, outputting predicted facial area coordinates of each image sample, and determining the difference between the predicted facial area coordinates and the calibrated facial area coordinates. Model parameters of the CNN model are adjusted based on the differences until the difference between the predicted facial area coordinates and the calibrated facial area coordinates are smaller than a difference threshold, it can be considered that the accuracy of the trained CNN model has reached the requirement, that is, it is determined that the training of the CNN model has been completed. The current (i.e., trained) CNN model may be determined as the facial detection model, and the current (i.e., adjusted) model parameters may be determined as model parameters of the facial detection model.

It should be noted that the above-described CNN model is merely one implementation manner of the facial detection model. In some other embodiments, the facial detection model can be realized by another deep learning model, or by another means.

In an implementation, after obtaining the facial detection model, the visible light image can be directly input into the facial detection model and, after the visible light image is processed by means of an input layer, a convolution layer, a pooling layer, and a fully connected layer included in the facial detection model, first facial area coordinates are output by an output layer included in the facial detection model.

It should be noted that the above description is only given by taking the facial detection model that includes an input layer, a convolution layer, a pooling layer, a fully connected layer, and an output layer as an example for description. In other embodiments, the facial detection model can include other structures such as an upper sampling layer, which are not limited by embodiments of the present application.

It should be noted that the above description is only given by using the facial detection model to determine the first facial area coordinates of the target in the visible light image as an example. In other embodiments, the first facial area coordinates of the target in the visible light image can be determined by other methods, which are not limited by embodiments of the present application.

In an implementation, the second mapping relationship can be determined in advance and stored in the infrared temperature measurement device. As an example, the second mapping relationship can be determined in the following way: capturing a plurality of frames of visible light images and a plurality of frames of grayscale images of a certain moving object, performing image detection respectively on the plurality of frames of visible light images and the plurality of frames of grayscale images to determine first coordinates of the object in each frame of visible light image and second coordinates of the object in each frame of grayscale image, and then determining a corresponding relationship between coordinates of a pixel point in a grayscale image and coordinates of a pixel point in a visible light image based on the plurality of first coordinates and the plurality of second coordinates, the corresponding relationship being referred to as a second mapping relationship. Optionally, each frame of visible light image in the plurality of frames of visible light images corresponds to at least one frame of the plurality of frames of grayscale images, and each frame of grayscale image in the plurality of frames of grayscale images corresponds to at least one frame of the plurality of frames of grayscale images, forming a plurality of visible light-grayscale image pairs. A frame of visible light image and a frame of grayscale image contained in each image pair can be captured at the same time or not, so long as a corresponding relationship can be formed. Subsequently, the first coordinates of the object in the visible light image contained in each image pair and the second coordinates of the object in the grayscale image contained in each image pair are determined. Thus, a plurality of first coordinates and a plurality of second coordinates that correspond to each other one by one are obtained. The second mapping relationship can be determined based on the plurality of first coordinates and the plurality of second coordinates that correspond to each other one by one.

As an example, after determining the second mapping relationship and the first facial area coordinates, second facial area coordinates corresponding to the first facial area coordinates can be determined directly from the second mapping relationship.

As an example, a facial area of the target in the visible light image can be represented by a first rectangular box circumscribing the facial area. Correspondingly, the first facial area coordinates can include coordinates of the four vertices of the first rectangular box. Similarly, the second facial area coordinates can include coordinates of four vertices of a second rectangular box corresponding to a facial area of the target in the grayscale image. Therefore, an area corresponding to the second facial area coordinates can be determined directly as the facial area of the target in the grayscale image. Optionally, the first facial area coordinates can include coordinates of only two diagonal vertices of the first rectangular box, for example, coordinates of the left upper and right lower vertices, or coordinates of right upper and left lower vertices. Similarly, the second facial area coordinates can include coordinates of only two diagonal vertices of the second rectangular box. Optionally, the facial area can be represented by coordinates of any one vertex or of the center point of the first rectangular box and the width and height of the first rectangular box.

Second way: if the infrared temperature measurement device includes a grayscale image capturing unit but does not comprise a visible light image capturing unit, a facial area of the target in a grayscale image can be determined by performing image detection on the grayscale image.

That is to say, in this implementation, it is not necessary to first determine coordinates of a facial area of the target in the visible light image before determining a facial area of the target in the grayscale image based on the facial area of the target in the visible light image. Instead, image detection is directly performed on the grayscale image to determine an area where the target is located in the grayscale image, then determine an area where the face of the target is located in the area where the target is located, and the determined area where the face of the target is located is determined as the facial area of the target in the grayscale image.

In an implementation, there are a plurality of pixel points in a facial area, and a specific implementation of determining a first measurement temperature based on the environment temperature, a grayscale of a pixel point in the facial area, and a specified functional relationship can include: determining a corresponding measurement temperature of each pixel point based on the environment temperature, a grayscale value of each pixel point in the plurality of pixel points, and the specified functional relationship to obtain a second measurement temperature of each pixel point. The first measurement temperature is determined based on the second measurement temperature of each pixel point in the plurality of pixel points. Optionally, the specified functional relationship in the second way is the same as the specified functional relationship in the first way, or can be different.

In other words, as there is a plurality of pixel points in the facial area, a second measurement temperature of each pixel point can be first determined respectively, based on the environment temperature, a grayscale value of each pixel point, and the specified functional relationship. Then the first measurement temperature is determined based on the second measurement temperatures of the plurality of pixel points.

As an example, the specified functional relationship can be determined in the following way: at a certain environment temperature, grayscale values corresponding to different measurement temperatures are acquired respectively. A first functional relationship between a set of measurement temperatures and grayscale values at the environment temperature can be obtained. Then, the above operation is performed at different environment temperatures. First functional relationships between a plurality of measurement temperature and grayscale values can be obtained. A first functional relationship between each set of measurement temperature and grayscale value corresponds to an environment temperature. A first functional relationship of is randomly selected among the first functional relationships and is referred to as the baseline response fit functional relationship. Then, based on this baseline response fit functional relationship, a conversion relationship between other first functional relationships and this first functional relationship is determined respectively to obtain a plurality of conversion relationships. As the conversion relationships correspond to environment temperatures, the conversion relationships can be fitted to a second functional relationship correlated with an environment temperature, and then the second functional relationship is fitted to the selected first functional relationship. A fitted functional relationship among an environment temperature, a grayscale value, and a measurement temperature can be obtained and is determined as the specified functional relationship.

By way of example, the process of determining a baseline fit response functional relationship can be referred to as baseline response fit.

In other words, baseline response fit can be performed by using a certain environment temperature as a baseline temperature and then fitting the functional relationship between a grayscale value and a measurement temperature at that temperature, the functional relationship referred to as the baseline response fit functional relationship. Then, based on the baseline response fit function, a conversion relationship between a response functional relationship at another environment temperature and the baseline fit response functional relationship is calculated and fitted to a functional relationship associated with the environment temperature, and the functional relationship is determined as the specified functional relationship.

In an implementation, for any pixel point among the plurality of pixel points, a grayscale value of this pixel point and the environment temperature can be input into the specified functional relationship to determine a second measurement temperature of this pixel point. After performing this operation on each pixel point among the plurality of pixel points, the second measurement temperature of each pixel point can be determined.

As an example, after determining the second measurement temperatures of the plurality of pixel points, the second measurement temperatures of the plurality of pixel points can be summed up to calculate an average and the average can be determined as the first measurement temperature. By way of example, an area in a facial area where a forehead is located can be determined, the second measurement temperatures of pixel points in the area where the forehead is located can be summed up to calculate an average, and the average can be determined as the first measurement temperature.

In another possible mode of realization, a specific implementation of this step can include: obtaining an environment temperature, and determining measurement temperatures of all pixel points in the grayscale image based on the environment temperature, grayscale values of all pixel points in the grayscale image, and the specified functional relationship. Then, a facial area of the target in the grayscale image is determined, thus measurement temperatures of a plurality of pixel points in the facial area are determined, and then the first measurement temperature is determined based on the measurement temperatures of the plurality of pixel points in the facial area.

In other words, in this mode of realization, a measurement temperature of each pixel point in the grayscale image can be directly determined without first determining the facial area of the target, then the facial area of the target in the grayscale image is determined, then a measurement temperature of a pixel point in the facial area is determined, and thus the first measurement temperature is determined based on the measurement temperatures of the pixel points in the facial area.

It should be noted that, in this implementation, the process of determining the measurement temperatures of the pixel points and determining a facial area of the target in the grayscale image in this mode of realization is the same as, or similar to the principle of the previous implementation. One can refer to the relevant description of the previous implementation for details, which is not repeated here.

Step 202: determining key point coordinates of the target based on a target image.

The target image can include a grayscale image, or the target image can include a visible light image, or, the target image can include a fusion image determined by fusing a visible light image and a grayscale image. In an implementation, the target image is not limited to the above described three types of images, and can be another image. It should be noted that here, the grayscale image included in the target image refers to a grayscale image used for determining a first measurement temperature of a to-be-measured target, or refers to a grayscale image used for determining a facial area of the target. The visible light image included in the target image refers to a visible light image used for determining a facial area of the target. The fusion image can be used for determining a measurement temperature of the target, and can also be used for determining a facial area of the target.

The key point coordinates are coordinates of a representative point among all the points of the target. For example, assuming the target is a human, the key point coordinates can be the coordinates of an eye of the human. The key point coordinates can also be the coordinates of the human's eyebrow, ear, nose, mouth, etc.

In an implementation, image detection can be performed on the grayscale image to determine the key point coordinates of the target. Alternatively, image detection can be performed on the visible light image to determine the key point coordinates of the target. Alternatively, image detection can be performed on the fusion image to determine key point coordinates of the target.

Since the visible light image is colored and it can truly reflect the external environment and display the target clearly, performing image detection on the visible light image may provide better results. Therefore, key point coordinates of the target in the visible light image can be determined by performing image detection on the visible light image.

A specific implementation of this step is described below by using an example where the target image is a visible light image.

In an implementation, a CNN (Convolutional Neural Network) image key point detection model can be used to determine key point coordinates of the target in the visible light image.

As an example, the CNN model can be a VGG-Net (Visual Geometry Group) model, a ResNet model, etc. By way of example, the CNN model can include an input layer, a convolution layer, a pooling layer, a fully connected layer, and an output layer.

In an implementation, the CNN model needs to be first trained to obtain an image key point detection model.

As an example, a plurality of image samples are captured, and key point coordinates of a target sample in each image sample are calibrated. An image sample and the calibrated key point coordinates of the target sample in the image sample are taken as a training data set. Thus, a plurality of training data sets is determined. Then, the plurality of training data sets are input into the CNN model to perform model training to output predicted key point coordinates of each image sample. The differences between the predicted key point coordinates and the calibrated key point coordinates are determined. Model parameters of the CNN model are adjusted based on the difference until the differences between the predicted key point coordinates and the calibrated key point coordinates are smaller than a difference threshold. It can be concluded that the precision of the CNN model has met the requirements, that is, it is determined that the training of the CNN model has been completed. The current (i.e., the trained) CNN model can be determined as the image key point detection model, and the current (i.e., the adjusted) model parameters are determined as the model parameters of the image key point detection model. Optionally, the plurality of image samples can be the image samples used in the above-described process of determining the facial detection model, or can be separately captured image samples, or can overlap in part with the above-described image samples, which is not limited by embodiments of the present application. Optionally, the structure of the image key point detection model is the same as the structure of the above-described facial detection model, or can be different.

It should be noted that the difference threshold can be set based on actual needs of a user, or can be set by default by the infrared temperature measurement device, which is not limited by embodiments of the present application. In addition, the above CNN model is only an implementation manner of the key point detection model, and in some other embodiments, the key point detection model may also be implemented by other deep learning models, or implemented by other means.

In an implementation, after the image key point detection model is obtained, a visible light image with a key point to-be-measured can be directly input to the image key point detection model. After the visible light image is processed by the input layer, the convolution layer, the pooling layer, and the fully connected layer included in the image key point detection model, key point coordinates are output from the output layer of the image key point detection model.

It should be noted that the above description is made by using the image key point detection model that includes an input layer, a convolution layer, a pooling layer, a fully connected layer, and an output layer as an example. In another embodiment, the image key point detection model can further include another structure such as an upper sampling layer, which is not limited by embodiments of the present application.

It should be noted that the above description is made by using the image key point detection model to determine key point coordinates of the target in a visible light image as an example. In another embodiment, other methods can be used to determine key point coordinates of the target in a visible light image, which is not limited by embodiments of the present application.

By way of example, another image detection method can be used to perform detection on the visible light image to determine an area where the to-be-measured target is located. Then, a key point in the to-be-measured target is identified, and key point coordinates are determined based on the location of the key point in the visible light image. For example, assuming the to-be-measured target is a human, an area where the human is located in the visible light image can be determined first. Then, the two eyes of the human are identified in the area, and coordinates of the two eyes are determined. The coordinates of the two eyes are determined as the key point coordinates.

It should be noted that the above description is made by using the target image that is a visible light image as an example. In an implementation, other images such as a grayscale image or a fusion image can be used to determine key point coordinates of the target.

Step 203: determining a first distance based on the key point coordinates and configuration information of the infrared temperature measurement device, the first distance is a distance between the target and the infrared temperature measurement device.

The key point coordinates of the target can include coordinates of a first key point and coordinates of a second key point, the first key point and the second key point are any two key points in key points of the target between which the actual distance is known. For example, the first key point is a point corresponding to the left eye of a face, and the second key point is a point corresponding to the right eye of the face. As another example, the first key point is a point corresponding to the left eyebrow of a face, and the second key point is a point corresponding to the right eyebrow of the face. As yet another example, the first key point is a point corresponding to the nose of a face, and the second key point is a point corresponding to the left eye of the face.

The configuration information of the infrared temperature measurement device can include a focal distance and a pixel size. The pixel size can be the distance between two pixel points in an image. By way of example, the pixel size is the distance between two adjacent pixel points in an image.

In an implementation, a specific implementation of this step can include: determining a horizontal distance between the first key point and the second key point in the target image, and determining a vertical distance between the first key point and the second key point in the target image, based on the coordinates of the first key point and the coordinates of the second key point, obtaining a first horizontal distance and a first vertical distance. A second distance is determined based on the first horizontal distance, the first vertical distance, and the pixel size, wherein the second distance is the distance between the first key point and the second key point in the target image. The first distance is determined based on a first actual distance, the focal distance, and the second distance, wherein the first actual distance is the actual distance between the first key point and the second key point.

In other words, the first horizontal distance and the first vertical distance in the target image of the first key point and the second key point can be determined based on the coordinates of the first key point and the coordinates of the second key point. Then, the second distance of the first key point and the second key point in the target point is determined based on the first horizontal distance, the first vertical distance, and the pixel size. Then, the first distance is determined based on the second distance, the focal distance, and the first actual distance of the first key point and the second key point.

As an example, assuming the coordinates of the first key point is $(x_1, y_1)$, and the coordinates of the second key point is $(x_2, y_2)$, it can be determined that the first horizontal distance is $\sqrt{(x_1-x_2)^2}$, and the first vertical distance is $\sqrt{(y_1-y_2)^2}$.

As an example, based on the first horizontal distance, the first vertical distance, and the pixel size, the second distance can be determined using the following equation (1):

$$L = S \times (x_1-x_2)^2 + (y_1-y_2)^2 \qquad (1)$$

wherein, L is the second distance, S is the pixel size, $(x_1-x_2)^2$ is the square of the first horizontal distance, and $(y_1-y_2)^2$ is the square of the first vertical distance.

In an implementation, after the second distance is determined, the first distance can be determined based on a first actual distance, the focal distance, and the second distance. Specifically, the step can include: multiplying the first actual distance by the focal distance to obtain a first value; dividing the first value by the second distance to obtain a second value; determining the second value as the first distance.

As an example, the above-described step can be expressed by equation (2):

$$D = \frac{L_R \times D_f}{L} \qquad (2)$$

wherein, D is the first distance, $L_R$ is the first actual distance, $D_f$ is the focal distance, and L is the second distance.

Figure 3:
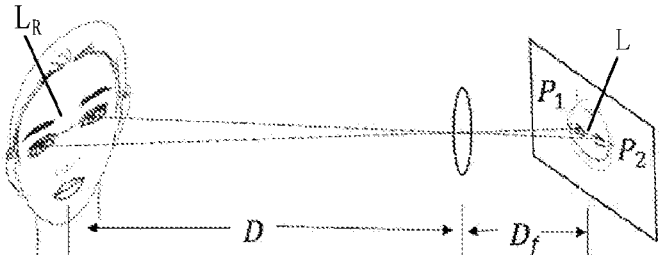
FIG. 3 is a schematic view of distance measurement illustrated according to an exemplary embodiment.

By way of example, in reference to FIG. 3, assuming in FIG. 3, $P_1$ is the first key point, $P_2$ is the second key point, the first actual distance $L_R$ is 6.5 cm, the focal distance $D_f$ is f 50 mm, and the second distance L is 10 mm, the first actual distance can be multiplied by the focal distance to obtain a first value of 32.5 cm². A second value of 325 cm can be obtained by dividing the first value by the second distance. It can be determined that the first distance is 3.25 m. In other words, the distance between the target and the infrared temperature measurement device is 3.25 m.

Further, as the target in a captured image is not necessarily directly facing a lens, in this case, the second distance determined according to the above-described step may not be accurate. Therefore, before determining a second distance based on the first horizontal distance, the first vertical distance, and the pixel size, it can be first determined whether the target is directly facing the lens. As a visible light image can clearly reflect the environment, whether the target is directly facing the lens can be determined based on a visible light image.

In an implementation, the target image can include a visible light image, and the key point coordinates can be facial key point coordinates. If it is determined that a facial area of the target is not a frontal image based on the visible light image, a yaw angle and a pitch angle of the target are determined. The first horizontal distance is corrected based on the yaw angle and the first vertical distance is corrected based on the pitch angle to obtain a second horizontal distance and a second vertical distance. The second distance is determined based on the second horizontal distance, the second vertical distance, and the pixel size.

In other words, if the key point coordinates are the facial key point coordinates, in the event that it is determined that the facial area of the target determined based on image detection of the visible light image is not a frontal image, a yaw angle in the horizontal direction and a pitch angle in the vertical direction of the target can be determined based on image detection. Then, a corrected second horizontal distance is determined based on the yaw angle and the first horizontal distance, and a corrected second vertical distance is determined based on the pitch angle and the first vertical distance. Then, the second distance is determined based on the second horizontal distance, the second vertical distance, and the pixel size.

As an example, the second horizontal distance can be obtained by dividing the first horizontal distance by the cosine of the yaw angle, and the second vertical distance can be obtained by dividing the first vertical distance by the cosine of the pitch angle. Then, by inputting the second horizontal distance and the second vertical distance into the above-described equation (1), the second distance can be obtained.

Further, the target image includes a visible light image, the key point coordinates are facial key point coordinates, and before determining the first distance based on the key point coordinates and configuration information of the infrared temperature measurement device, the method further includes: if it is determined that a facial area of the target is not a frontal image based on the visible light image, correcting the facial area based on the key point coordinates. Key point coordinates of the corrected facial area are determined. The first distance is determined based on the key point coordinates of the corrected facial area and the configuration information.

In other words, before executing this step, it can be determined first whether the target in the image directly faces the lens. In the event that the facial area of the target determined based on image detection of the visible light image is not a frontal image, the facial area of the target can be corrected by means of a 3D facial pose correction algorithm based on the key point coordinates to obtain a frontal facial area image. Then, by means of the above-described method of determining the key point coordinates of the target, the key point coordinates of the corrected facial area are determined. The first distance is determined based on the key point coordinates of the corrected facial area and the configuration information.

It should be noted that, a specific implementation of determining the first distance based on the key point coordinates of the corrected facial area and the configuration information is in principle the same as, or similar to, the process of realizing this step. One can refer to the relevant description of this step for details, which are not repeated here.

It should be noted that the above description is only an example of determining whether the target is directly facing the lens based on the visible light image. In other embodiments, it is also possible to determine whether the target is directly facing the lens based on a fusion image or another image.

Step 204: determining an actual temperature of the target based on the first measurement temperature and the first distance.

Because when the first distance is different, the infrared energy received by the infrared temperature measurement device is different, the determined measurement temperature is different. Therefore, the first measurement temperature can be compensated based on the first distance, so as to determine the actual temperature of the target.

In an implementation, a specific implementation of this step can include: determining a corresponding temperature from a first mapping relationship based on the first measurement temperature and the first distance, the first mapping relationship is used for indicating a corresponding relationship among a measurement temperature, the distance between the target and the infrared temperature measurement device, and a temperature; determining the temperature determined as the actual temperature of the target.

As the corresponding relationship between a temperature, a distance between a target and an infrared temperature measurement device, and a measurement temperature can be determined in advance and stored in the infrared temperature measurement device, and based on the first mapping relationship among the three, the other parameter can be determined when two of the parameters are known. Therefore, in order to determine a temperature, a first measurement temperature and a first distance can be determined first, and then the temperature of the target is determined based on the first measurement temperature, the first distance, and the first mapping relationship, that is, the actual temperature of the target is determined.

Optionally, the first mapping relationship can be determined by studying an object (such as a target), the first mapping relationship is used for indicating a corresponding relationship among a measurement temperature of an object, the temperature between the object and the infrared temperature measurement device, and the object temperature of the object (i.e., the actual temperature of the object).

As an example, the first mapping relationship can be determined in the following way: at a certain temperature, in other words, in the event that the object temperature of an object (such as a target) is at a certain temperature, measurement temperatures corresponding to different distances between an object and the infrared temperature measurement device is recorded respectively. A set of corresponding relationships between the distance between an object and the infrared temperature measurement device and a measurement temperature at the object temperature can be obtained. Different distances between an object and the infrared temperature measurement device can mean different distances between the same object and the infrared temperature measurement device, or the respective difference distances between a plurality of different objects and the infrared temperature measurement device. In other words, in the event that the object is at a certain temperature, by adjusting the distance, measurement temperatures at different distances are obtained. Then, the above-described operation is performed at different object temperatures to obtain a set of corresponding relationships between the distance between an object and the infrared temperature measurement device and a measurement temperature. Then, a corresponding relationship among the distance between a target and the infrared temperature measurement device, a temperature, and a measurement temperature is determined based on the above-described plurality of sets of corresponding relationships to obtain a first mapping relationship.

It should be noted that, as a black body is a standard object for thermal radiation study and it can absorb all outside electromagnetic radiation without any reflection and transmission, and the black body is often used to correct and calibrate a radiation thermometer in the field of temperature measurement. Therefore, in embodiments of the present application, in both processes of determining the first mapping relationship and the specified functional relationship, a black body can be used as the target. In other words, a black body is used as the object under study, so that the first mapping relationship and specified functional relationship obtained are more accurate.

In an implementation, in the event that the first measurement temperature and the first distance are determined, a corresponding temperature can be determined directly from the first mapping relationship and determined as the actual temperature of the target. In this way, the target image ranging and grayscale image temperature measurement can be combined, and the temperature compensation is performed on the first measurement temperature based on the first distance, which can reduce the effect of distance on the temperature, thus improving the temperature measuring accuracy of the infrared temperature measurement device.

In embodiments of the present application, the first measurement temperature is obtained by determining a measurement temperature of a to-be-measured target based on a grayscale image captured. As the distance between the to-be-measured target and an infrared temperature measurement device will affect the first measurement temperature, one can first determine key point coordinates of the target based on a target image, then determine a first distance between the target and the infrared temperature measurement device based on the key point coordinates and configuration information of the infrared temperature measurement device, and then determine an actual temperature of the target based on the first measurement temperature and the first distance. In this way, the first distance can be determined based on the target image without controlling the distance between the target and the infrared temperature measurement device, and the actual temperature of the target can be obtained by compensating the first measurement temperature based on the first distance. The target image ranging and grayscale image temperature measurement can be combined, which not only reduces the influence of distance on the measurement temperature, but also avoids the problem of inaccurate measurement temperature when the distance does not meet the requirements, thus improving temperature measuring precision and temperature measuring efficiency. To facilitate understanding, the infrared temperature measurement method proposed by embodiments of the present application is explained and described in connection with FIGS. 4, 5, and 6.

Figure 4:
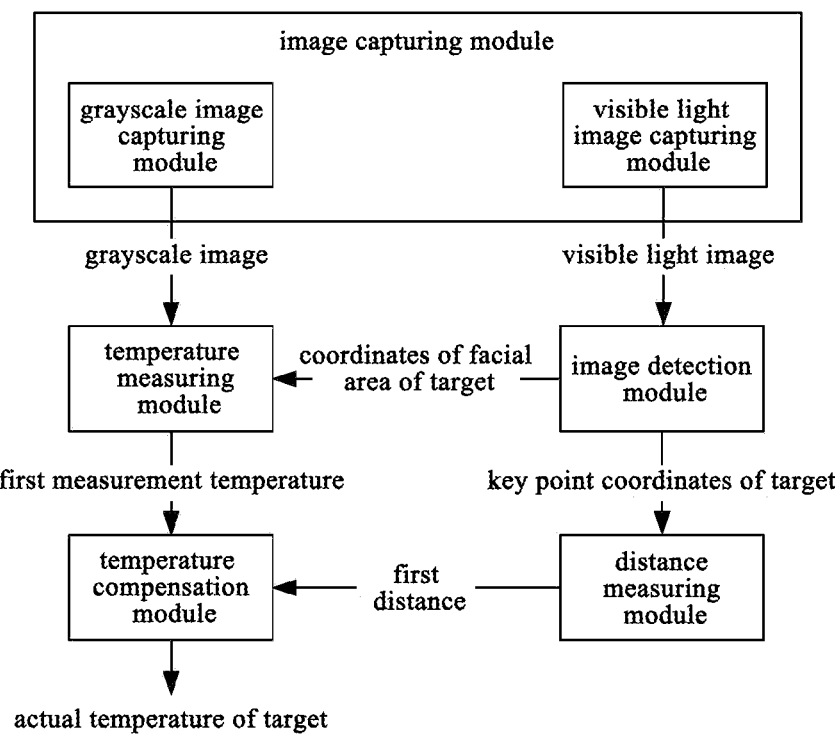
FIG. 4 is a flow chart of an infrared temperature measurement method illustrated according to another exemplary embodiment.

As an example, in reference to FIG. 4, the infrared temperature measurement device can include an image capturing module, a temperature measuring module, an image detection module, a distance measuring module, and a temperature compensation module. In this example, the image capturing module can include a visible light image capturing unit and a grayscale image capturing unit.

The visible light image capturing unit is used for capturing a visible light image and sending the visible light image to the image detection module. The image detection module is used for performing image detection on the visible light image to determine a facial area of the target in the visible light image, sending coordinates of the determined facial area to the temperature measuring module, determining key point coordinates of the target, and sending the determined key point coordinates to the distance measuring module. The grayscale image capturing unit is used for capturing a grayscale image and sending the grayscale image to the temperature measuring module. The temperature measuring module determines a first measurement temperature of the target based on the received grayscale image and coordinates of the facial area of the target, and sends the first measurement temperature to the temperature compensation module. The distance measuring module, after receiving the key point coordinates of the target, determines a first distance between the target and the infrared temperature measurement device, and seconds the first distance to the temperature compensation module. The temperature compensation module determines an actual temperature of the target based on the received first distance and first measurement temperature.

Figure 5:
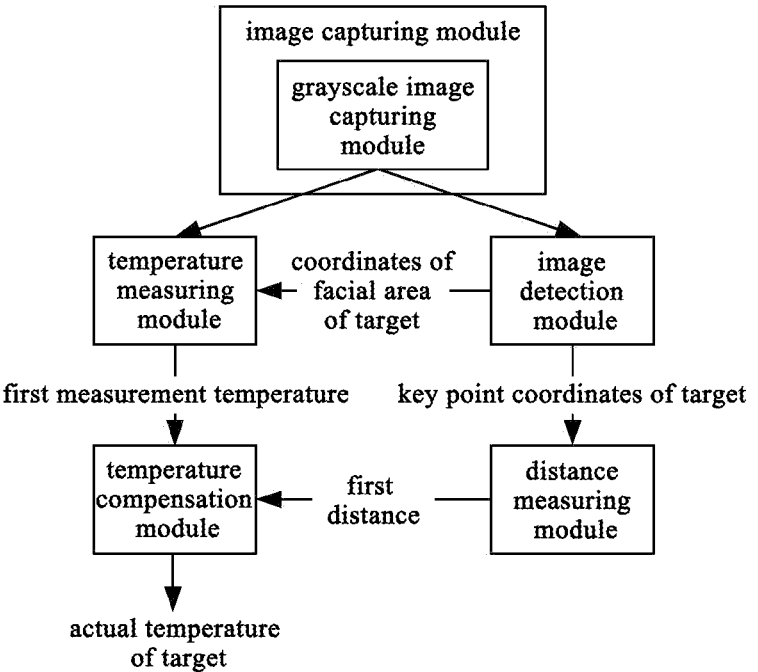
FIG. 5 is a flow chart of an infrared temperature measurement method illustrated according to another exemplary embodiment.

As another example, in reference to FIG. 5, the infrared temperature measurement device can include an image capturing module, a temperature measuring module, an image detection module, a distance measuring module, and a temperature compensation module. In this example, the image capturing module can include a grayscale image capturing unit.

The grayscale image capturing unit is used for capturing a grayscale image and sending the grayscale image to the temperature measuring module and the image detection module. The image detection module is used for performing detection on the grayscale image to determine key point coordinates of the target and coordinates of the facial area of the target in the grayscale image, and sending the key point coordinates to the distance measuring module and the coordinates of the facial area of the target to the temperature measuring module. The distance measuring module, after receiving the key point coordinates, determines a first distance between the target and the infrared temperature measurement device based on the key point coordinates, and sends the first distance to the temperature compensation module. The temperature measuring module is used for determining a first measurement temperature based on the grayscale image and the coordinates of the facial area of the target, and sending the first measurement temperature to the temperature compensation module. The temperature compensation module is used for determining an actual temperature of the target based on the first measurement temperature and the first distance.

Figure 6:
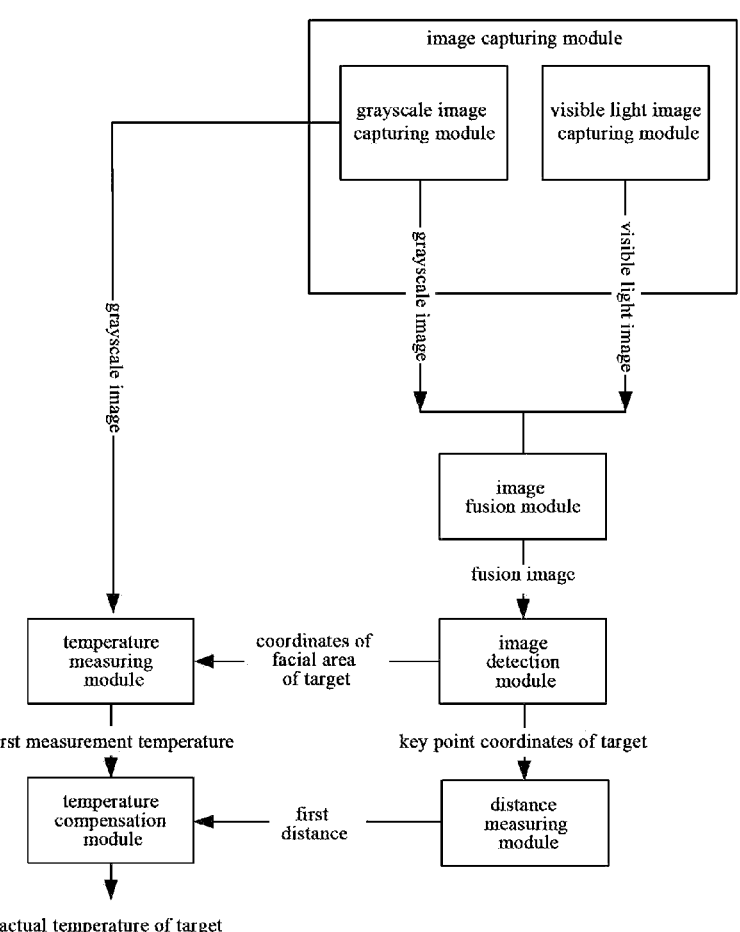
FIG. 6 is a flow chart of an infrared temperature measurement method illustrated according to an exemplary embodiment.

As another example, in reference to FIG. 6, the infrared temperature measurement device can include an image capturing module, a temperature measuring module, an image detection module, a distance measuring module, a temperature compensation module, and an image fusion module. In this example, the image capturing module can include a grayscale image capturing unit and a visible light image capturing unit.

The visible light image capturing unit is used for capturing a visible light image and sending the visible light image to the image fusion module. The grayscale image capturing unit is used for capturing a grayscale image and sending the grayscale image to the image fusion module. The image fusion module is used for performing image fusion on the visible light image and the grayscale image to obtain a fusion image, and sending the fusion image to the image detection module. The image detection module is used for performing image detection on the fusion image to determine key point coordinates of the target and coordinates of a facial area of the target, sending the determined key point coordinates to the distance measuring module, and sending the coordinates of the facial area of the target to the temperature measuring module. The temperature measuring module is used for determining a first measurement temperature of the target based on the grayscale image, and sending the first measurement temperature to the temperature compensation module. The distance measuring module, after receiving the key point coordinates of the target, determines a first distance between the target and the infrared temperature measurement device, and seconds the first distance to the temperature compensation module. The temperature compensation module determines an actual temperature of the target based on the received first distance and first measurement temperature.

Figure 7:
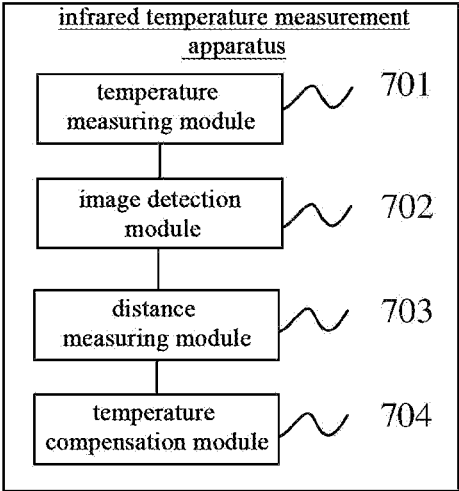
FIG. 7 is a schematic structural view of an infrared temperature measurement apparatus illustrated according to an exemplary embodiment.

FIG. 7 is a schematic structural view of an infrared temperature measurement apparatus illustrated according to an exemplary embodiment. The infrared temperature measurement apparatus can be implemented by software, hardware, or a combination therefore, as part or all of an infrared temperature measurement device, which can be the device shown in FIG. 1. In reference to FIG. 9, the infrared temperature measurement apparatus includes: a temperature measuring module 701, an image detection module 702, a distance measuring module 703, and a temperature compensation module 704.

The temperature measuring module 701 is configured for determining a measurement temperature of a to-be-measured target based on the grayscale image captured to obtain a first measurement temperature;

The image detection module 702 is configured for determining key point coordinates of the target based on a target image;

The distance measuring module 703 is configured for determining a first distance based on the key point coordinates and configuration information of the infrared temperature measurement device, wherein the first distance is a distance between the target and the infrared temperature measurement device;

The temperature compensation module 704 is configured for determining an actual temperature of the target based on the first measurement temperature and the first distance.

As an example, the infrared temperature measurement apparatus can further include an image capturing module used for capturing a grayscale image.

In a possible mode of realization of embodiments of the present application, the target image includes a grayscale image; or, the target image includes a visible light image; or the target image includes a fusion image determined based on the grayscale image and the visible light image.

In a possible mode of realization of embodiments of the present application, the distance measuring module 703 is configured for:

the key point coordinates of the target include coordinates of a first key point and coordinates of a second key point, wherein the first key point and the second key point are any two key points whose actual distance is known among key points of the target, the configuration information includes a focal distance and a pixel size;

determining a horizontal distance between the first key point and the second key point in the target image, and determining a vertical distance between the first key point and the second key point in the target image, based on the coordinates of the first key point and the coordinates of the second key point to obtain a first horizontal distance and a first vertical distance;

determining a second distance based on the first horizontal distance, the first vertical distance, and the pixel size, wherein the second distance is a distance between the first key point and the second key point in the target image;

determining the first distance based on a first actual distance, the focal distance, and the second distance, wherein the first actual distance is an actual distance between the first key point and the second key point.

In a possible mode of realization of embodiments of the present application, the distance measuring module 703 is further configured for:

the target image includes a visible light image, the key point coordinates are facial key point coordinates, if it is determined that a facial area of the target is not a frontal image based on the visible light image, determining a yaw angle and a pitch angle of the target;

correcting the first horizontal distance based on the yaw angle and correcting the first vertical distance based on the pitch angle to obtain a second horizontal distance and a second vertical distance;

determining the second distance based on the second horizontal distance, the second vertical distance, and the pixel size.

In a possible mode of realization of embodiments of the present application, the distance measuring module 703 is further configured for:

the target image includes a visible light image, the key point coordinates are facial key point coordinates, if it is determined that a facial area of the target is not a frontal image based on the visible light image, correcting the facial area based on the key point coordinates;

determining key point coordinates of the corrected facial area;

determining the first distance based on the key point coordinates of the corrected facial area and the configuration information.

In a possible mode of realization of embodiments of the present application, the distance measuring module 703 is configured for:

multiplying the first actual distance by the focal distance to obtain a first value;

dividing the first value by the second distance to obtain a second value;

determining the second value as the first distance.

In a possible mode of realization of embodiments of the present application, the temperature compensation module 704 is configured for:

determining a corresponding temperature from a first mapping relationship based on the first measurement temperature and the first distance, the first mapping relationship is used for indicating a corresponding relationship among a measurement temperature, the distance between the target and the infrared temperature measurement device, and a temperature;

determining the temperature determined as the actual temperature of the target.

In a possible mode of realization of embodiments of the present application, the temperature measuring module 701 is configured for:

determining a facial area of the target in the grayscale image;

obtaining an environment temperature;

determining the first measurement temperature based on the environment temperature, grayscale values of pixel points in the facial area, and a specified functional relationship, the specified functional relationship is used for indicating a functional relationship among an environment temperature, a grayscale value, and a measurement temperature.

In a possible mode of realization of embodiments of the present application, the temperature measuring module 701 is configured for:

the target image includes a visible light image, determining first facial area coordinates of the target in the visible light image, the first facial area coordinates are used for indicating a facial area of the target in the visible light image;

determining corresponding second facial area coordinates from a second mapping relationship based on the first facial area coordinates, the second mapping relationship is used for indicating a corresponding relationship between coordinates of a pixel point in the grayscale image and coordinates of a pixel point in the visible light image;

determining the facial area of the target in the grayscale image based on the second facial area coordinates.

In a possible mode of realization of embodiments of the present application, the temperature measuring module 701 is configured for:

there are a plurality of pixel points in the facial area, determining a measurement temperature corresponding to each pixel point based on the environment temperature, a grayscale value of each pixel point of the plurality of pixel points, and the specified functional relationship to obtain a second measurement temperature of each pixel point;

determining the first measurement temperature based on the second measurement temperature of each pixel point of the plurality of pixel points.

In embodiments of the present application, the first measurement temperature is obtained by determining a measurement temperature of a to-be-measured target based on a grayscale image captured. As the distance between the to-be-measured target and an infrared temperature measurement device will affect the first measurement temperature, one can first determine key point coordinates of the target based on a target image, then determine a first distance between the target and the infrared temperature measurement device based on the key point coordinates and configuration information of the infrared temperature measurement device, and then determine an actual temperature of the target based on the first measurement temperature and the first distance. In this way, the first distance can be determined based on the target image without controlling the distance between the target and the infrared temperature measurement device, and the actual temperature of the target can be obtained by compensating the first measurement temperature based on the first distance. The target image ranging and grayscale image temperature measurement can be combined, which not only reduces the influence of distance on the measurement temperature, but also avoids the problem of inaccurate measurement temperature when the distance does not meet the requirements, thus improving temperature measuring precision and temperature measuring efficiency.

It should be noted that when the infrared temperature measurement apparatus provided in the above-described embodiments measures temperature, only the division of the above functional modules is used as an example for illustration. In an actual application, the above-described functions can be assigned to different functional modules to accomplish based on needs. In other words, the internal structure of the apparatus is divided into different functional modules to accomplish all or part of the functions described above. In addition, the infrared temperature measurement apparatus provided in the above-described embodiments and the infrared temperature measurement method embodiments belong to the same concept, and one can refer to the method embodiments for details of its specific implementation process, which will not be repeated here.

In some embodiments, there is also provided a computer readable storage medium that has a computer program stored therein, when the computer program is executed by a processor, the steps of the infrared temperature measurement method in the above-mentioned embodiments are implemented. For example, the computer readable storage medium can be a ROM, RAM, CD-ROM, magnetic tape, floppy disk, optical data storage device, etc.

It should be noted that the computer readable storage medium mentioned in embodiments of the present application may be a non-volatile storage medium. In other words, it may be a non-transitory storage medium.

It should be understood that, all or some of the steps of implementing the above-described embodiments may be implemented by software, hardware, firmware, or any combination thereof. When implemented by software, it can be implemented in whole or in part in the form of a computer program product. The computer program product comprises one or more computer instructions. The computer instructions can be stored in the computer readable storage medium described above.

In other words, in some embodiments, there is also provided a computer program product containing instructions that, when executed on a computer, cause the computer to execute the steps of the above-mentioned infrared temperature measurement method.

What have been described above are embodiments provided by the present application and are not intended to limit the present application. Any modification, equivalent replacement, improvement, etc. made within the spirit and principle of the present application shall fall within the protection scope of the present application.

The invention claimed is:

1. An infrared temperature measurement method, wherein, the method comprises:

determining a measurement temperature of a to-be-measured target based on a grayscale image captured to obtain a first measurement temperature;

determining key point coordinates of the target based on a target image;

determining a first distance based on the key point coordinates and configuration information of an infrared temperature measurement device, wherein the first distance is a distance between the target and the infrared temperature measurement device;

determining an actual temperature of the target based on the first measurement temperature and the first distance, wherein, the key point coordinates of the target comprise coordinates of a first key point and coordinates of a second key point, wherein the first key point and the second key point are any two key points whose actual distance is known among key points of the target, the configuration information comprises a focal distance and a pixel size;

determining the first distance based on the key point coordinates and the configuration information of the infrared temperature measurement device, comprises:

determining a horizontal distance between the first key point and the second key point in the target image, and determining a vertical distance between the first key point and the second key point in the target image, based on the coordinates of the first key point and the coordinates of the second key point to obtain a first horizontal distance and a first vertical distance;

determining a second distance based on the first horizontal distance, the first vertical distance, and the pixel size, wherein the second distance is a distance between the first key point and the second key point in the target image;

determining the first distance based on a first actual distance, the focal distance, and the second distance, wherein the first actual distance is an actual distance between the first key point and the second key point, wherein, the target image comprises a visible light image, the key point coordinates are facial key point coordinates, before determining the second distance based on the first horizontal distance, the first vertical distance and the pixel size, the method further comprises:

if it is determined that a facial area of the target is not a frontal image based on the visible light image, determining a yaw angle and a pitch angle of the target;

correcting the first horizontal distance based on the yaw angle and correcting the first vertical distance based on the pitch angle to obtain a second horizontal distance and a second vertical distance;

determining the second distance based on the first horizontal distance, the first vertical distance, and the pixel size, comprises:

determining the second distance based on the second horizontal distance, the second vertical distance, and the pixel size.

2. The method of claim 1, wherein the target image comprises the grayscale image or wherein the target image comprises a fusion image determined based on the grayscale image and the visible light image.

3. The method of claim 1, wherein the key point coordinates are facial key point coordinates, before determining the first distance based on the key point coordinates and the configuration information of the infrared temperature measurement device, the method further comprises:

if it is determined that a facial area of the target is not a frontal image based on the visible light image, correcting the facial area based on the key point coordinates;

determining key point coordinates of the corrected facial area;

determining the first distance based on the key point coordinates and the configuration information of the infrared temperature measurement device, comprises:

determining the first distance based on the key point coordinates of the corrected facial area and the configuration information.

4. The method of claim 1, wherein, determining the first distance based on the first actual distance, the focal distance, and the second distance, comprises:

multiplying the first actual distance by the focal distance to obtain a first value;

dividing the first value by the second distance to obtain a second value;

determining the second value as the first distance.

5. The method of claim 1, wherein, determining the actual temperature of the target based on the first measurement temperature and the first distance, comprises:

determining a corresponding temperature from a first mapping relationship based on the first measurement temperature and the first distance, the first mapping relationship is used for indicating a corresponding relationship among a measurement temperature, the distance between the target and the infrared temperature measurement device, and a temperature;

determining the determined temperature as the actual temperature of the target;

or determining a measurement temperature of a to-be-measured target based on a grayscale image captured to obtain the first measurement temperature, comprises:

determining a facial area of the target in the grayscale image;

obtaining an environment temperature;

determining the first measurement temperature based on the environment temperature, grayscale values of pixel points in the facial area, and a specified functional relationship, the specified functional relationship is used for indicating a functional relationship among an environment temperature, a grayscale value, and a measurement temperature.

6. The method of claim 5, wherein determining the facial area of the target in the grayscale image comprises:

determining first facial area coordinates of the target in the visible light image, the first facial area coordinates are used for indicating a facial area of the target in the visible light image;

determining corresponding second facial area coordinates from a second mapping relationship based on the first facial area coordinates, the second mapping relationship is used for indicating a corresponding relationship between coordinates of a pixel point in the grayscale image and coordinates of a pixel point in the visible light image;

determining the facial area of the target in the grayscale image based on the second facial area coordinates;

or there is a plurality of pixel points in the facial area, determining the first measurement temperature based on the environment temperature, the grayscale values of the pixel points in the facial area, and the specified functional relationship, comprises:

determining a measurement temperature corresponding to each pixel point based on the environment temperature, a grayscale value of each pixel point of the plurality of pixel points, and the specified functional relationship to obtain a second measurement temperature of each pixel point;

determining the first measurement temperature based on the second measurement temperature of each pixel point of the plurality of pixel points.

7. An infrared temperature measurement device, wherein, the infrared temperature measurement device comprises an image sensor and a processor;

the image sensor is configured for capturing a grayscale image;

the processor is configured for performing the following operations:

determining a measurement temperature of a to-be-measured target based on the grayscale image captured to obtain a first measurement temperature;

determining key point coordinates of the target based on a target image;

determining a first distance based on the key point coordinates and configuration information of an infrared temperature measurement device, wherein the first distance is a distance between the target and the infrared temperature measurement device;

determining an actual temperature of the target based on the first measurement temperature and the first distance, wherein, the key point coordinates of the target comprise coordinates of a first key point and coordinates of a second key point, wherein the first key point and the second key point are any two key points whose actual distance is known among key points of the target, the configuration information comprises a focal distance and a pixel size;

determining the first distance based on the key point coordinates and the configuration information of the infrared temperature measurement device, comprises:

determining a horizontal distance between the first key point and the second key point in the target image, and determining a vertical distance between the first key point and the second key point in the target image, based on the coordinates of the first key point and the coordinates of the second key point to obtain a first horizontal distance and a first vertical distance;

determining a second distance based on the first horizontal distance, the first vertical distance, and the pixel size, wherein the second distance is a distance between the first key point and the second key point in the target image;

determining the first distance based on a first actual distance, the focal distance, and the second distance, wherein the first actual distance is an actual distance between the first key point and the second key point, wherein, the target image comprises a visible light image, the key point coordinates are facial key point coordinates, before determining the second distance based on the first horizontal distance, the first vertical distance and the pixel size, the processor is further configured for performing the following operations:

if it is determined that a facial area of the target is not a frontal image based on the visible light image, determining a yaw angle and a pitch angle of the target;

correcting the first horizontal distance based on the yaw angle and correcting the first vertical distance based on the pitch angle to obtain a second horizontal distance and a second vertical distance;

determining the second distance based on the first horizontal distance, the first vertical distance, and the pixel size, comprises:

determining the second distance based on the second horizontal distance, the second vertical distance, and the pixel size.

8. The infrared temperature measurement device of claim 7, wherein, the infrared temperature measurement device further comprises a temperature sensor, the temperature sensor is configured for obtaining an environment temperature, the environment temperature is used by the processor to determine the first measurement temperature.

9. The infrared temperature measurement device of claim 7, wherein the infrared temperature measurement device comprises a binocular camera device, the binocular camera device is configured for capturing the grayscale image and the visible light image through the image sensor.

10. A non-transitory computer readable storage medium, wherein, the computer readable storage medium has a computer program stored therein, when the computer program is executed by a processor, the method of claim 1 is implemented.

11. The infrared temperature measurement device of claim 7, wherein the target image comprises the grayscale image or wherein the target image comprises a fusion image determined based on the grayscale image and the visible light image.

12. The infrared temperature measurement device of claim 7, wherein the key point coordinates are facial key point coordinates, before determining the first distance based on the key point coordinates and the configuration information of the infrared temperature measurement device, the processor is further configured for performing the following operations:

if it is determined that a facial area of the target is not a frontal image based on the visible light image, correcting the facial area based on the key point coordinates;

determining key point coordinates of the corrected facial area;

determining the first distance based on the key point coordinates and the configuration information of the infrared temperature measurement device, comprises:

determining the first distance based on the key point coordinates of the corrected facial area and the configuration information.

13. The infrared temperature measurement device of claim 7, wherein, determining the first distance based on the first actual distance, the focal distance, and the second distance, comprises:

multiplying the first actual distance by the focal distance to obtain a first value;

dividing the first value by the second distance to obtain a second value;

determining the second value as the first distance.

14. The infrared temperature measurement device of claim 7, wherein, determining the actual temperature of the target based on the first measurement temperature and the first distance, comprises:

determining a corresponding temperature from a first mapping relationship based on the first measurement temperature and the first distance, the first mapping relationship is used for indicating a corresponding relationship among a measurement temperature, the distance between the target and the infrared temperature measurement device, and a temperature;

determining the determined temperature as the actual temperature of the target;

or determining a measurement temperature of a to-be-measured target based on a grayscale image captured to obtain the first measurement temperature, comprises:

determining a facial area of the target in the grayscale image;

obtaining an environment temperature;

determining the first measurement temperature based on the environment temperature, grayscale values of pixel points in the facial area, and a specified functional relationship, the specified functional relationship is used for indicating a functional relationship among an environment temperature, a grayscale value, and a measurement temperature.

15. The infrared temperature measurement device of claim 14, wherein determining the facial area of the target in the grayscale image comprises:

determining first facial area coordinates of the target in the visible light image, the first facial area coordinates are used for indicating a facial area of the target in the visible light image;

determining corresponding second facial area coordinates from a second mapping relationship based on the first facial area coordinates, the second mapping relationship is used for indicating a corresponding relationship between coordinates of a pixel point in the grayscale image and coordinates of a pixel point in the visible light image;

determining the facial area of the target in the grayscale image based on the second facial area coordinates;

or there is a plurality of pixel points in the facial area, determining the first measurement temperature based on the environment temperature, the grayscale values of the pixel points in the facial area, and the specified functional relationship, comprises:

determining a measurement temperature corresponding to each pixel point based on the environment temperature, a grayscale value of each pixel point of the plurality of pixel points, and the specified functional relationship to obtain a second measurement temperature of each pixel point;

determining the first measurement temperature based on the second measurement temperature of each pixel point of the plurality of pixel points.

* * * * *